US008356352B1

(12) United States Patent
Wawda et al.

(10) Patent No.: US 8,356,352 B1
(45) Date of Patent: Jan. 15, 2013

(54) SECURITY SCANNER FOR USER-GENERATED WEB CONTENT

(75) Inventors: Abubakar Wawda, Los Angeles, CA (US); Gerry A. Egan, Santa Monica, CA (US); Adam Bromwich, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 1022 days.

(21) Appl. No.: 12/140,137

(22) Filed: Jun. 16, 2008

(51) Int. Cl.
*G06F 11/00* (2006.01)
(52) U.S. Cl. .............................. 726/22; 726/23; 726/24
(58) Field of Classification Search .............. 726/22–25, 726/12–15; 713/188
See application file for complete search history.

(56) References Cited

U.S. PATENT DOCUMENTS

| 7,178,166 | B1 * | 2/2007 | Taylor et al. | 726/25 |
| 7,657,838 | B2 * | 2/2010 | Daniell et al. | 715/752 |
| 2005/0102381 | A1 * | 5/2005 | Jiang et al. | 709/220 |
| 2006/0021029 | A1 * | 1/2006 | Brickell et al. | 726/22 |
| 2006/0089944 | A1 * | 4/2006 | Dandekar et al. | 707/102 |
| 2007/0174915 | A1 * | 7/2007 | Gribble et al. | 726/24 |
| 2007/0208822 | A1 * | 9/2007 | Wang et al. | 709/217 |
| 2007/0266079 | A1 * | 11/2007 | Criddle et al. | 709/203 |
| 2008/0282338 | A1 * | 11/2008 | Beer | 726/12 |
| 2009/0282485 | A1 * | 11/2009 | Bennett | 726/24 |

* cited by examiner

*Primary Examiner* — Nirav B Patel
(74) *Attorney, Agent, or Firm* — McKay and Hodgson, LLP; Serge J. Hodgson; Sean P. Lewis

(57) ABSTRACT

User-generated web content is received prior to posting by a client system, such as a web content hosting system. The user-generated web content is executed in a virtual environment and monitored for malicious behavior. Execution of the web content in the virtual environment forces code in the web content to run such that the actions the code takes, especially malicious behavior, are not obfuscated. If malicious behavior is detected, the user-generated web content is blocked from posting to the web content hosting system. Alternatively, when malicious behavior is not detected, the user-generated web content is permitted to be posted to the web content hosting system.

19 Claims, 3 Drawing Sheets

SECURITY SCANNER FOR USER-GENERATED WEB CONTENT

BACKGROUND

1. Field of the Invention

The present invention relates to computer system security. More particularly, the present invention relates to scanning of user-generated web content for malicious behavior.

2. Description of the Related Art

User content hosting web sites, such as eBay™, YouTube™, MySpace™, Facebook™, and Google™ AdSense, allow users to post user supplied content, such as sales advertisement web pages and personal web pages. User content hosting web sites often need to support the posting of complex web page information in order to compete with other similar sites. Malicious code, commonly termed malware, can be easily distributed via these web sites.

Often the user content hosting web sites allow users to post code, such as JavaScript, which can be used to exploit vulnerabilities on a user's browser. For example, these exploits can be used in phishing attacks or to download malware to the user's hard drive. Additionally, attackers can post links to external domains that host malware. Without the ability to conclusively scan these links, malware distribution can occur, placing the user content hosting web sites' customers at risk.

Currently, some user content hosting web sites utilize manpower intensive solutions to attempt to address this growing problem. For example, a suspicious user supplied web page listing is reviewed by a trained technician for malware. As hundreds of thousands of listings are generated each day, these solutions are an enormous cost to a web site that hosts user supplied content.

SUMMARY OF THE INVENTION

In accordance with one embodiment, a computer-implemented method for scanning user-generated web content for malicious behavior includes: receiving user-generated web content, the user-generated web content for posting to a web content hosting system; inputting the web content to a virtual machine; executing at least a portion of the web content by the virtual machine; monitoring the execution of the web content for malicious behavior; determining whether the malicious behavior is detected; upon a determination that the malicious behavior is detected, blocking posting of the web content to the web content hosting system; and, otherwise upon a determination that the malicious behavior is not detected, permitting posting of the web content to the web content hosting system.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
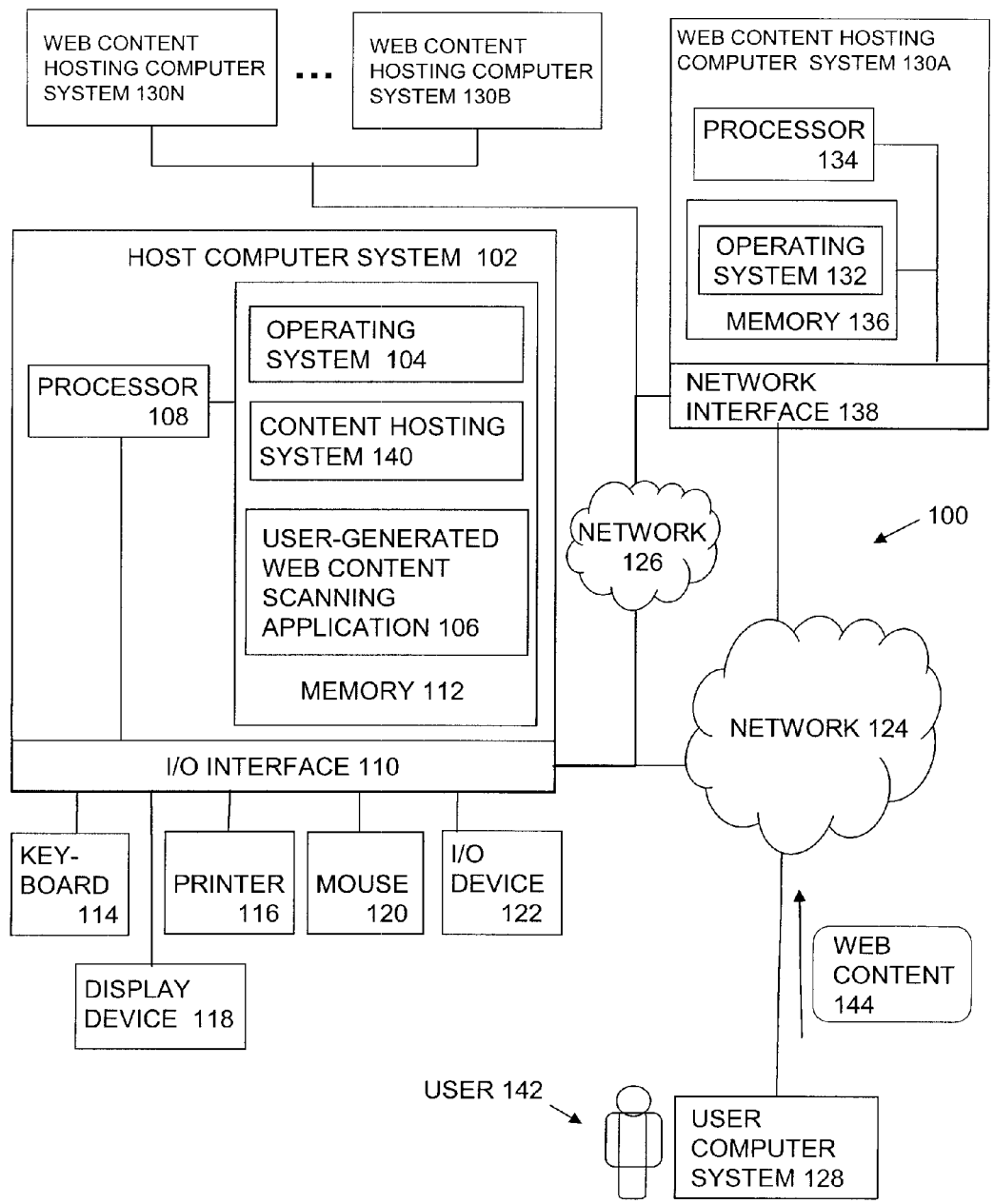
FIG. 1 is a diagram of a computer system including a user-generated web content scanning application executing on a host computer system in accordance with one embodiment.

Referring now more particularly to FIG. 1, FIG. 1 is a diagram of a computer system 100 that includes a user-generated web content scanning application 106 executing on a host computer system 102 in accordance with one embodiment.

Host computer system 102 typically includes a central processing unit (CPU) 108, sometimes called a processor 108, an input/output (I/O) interface 110, and a memory 112. In one embodiment, host computer system 102 further includes standard devices like a keyboard 114, a mouse 120, a printer 116, and a display device 118, as well as one or more standard input/output (I/O) devices 122, such as a compact disk (CD) or DVD drive, floppy disk drive, or other digital or waveform ports for inputting data to and outputting data from host computer system 102.

In one embodiment, user-generated web content scanning application 106 is stored, for example, in memory 112 of host computer system 102, and executed on host computer system 102. In one embodiment, user-generated web content scanning application 106 is loaded onto host computer system 102 via I/O device 122, such as from a CD, DVD, or floppy disk containing user-generated web content scanning application 106.

In one embodiment, host computer system 102 is part of a web content hosting system. For example, in one embodiment, host computer system 102 is one of a plurality of computer systems, such as a plurality of server computer systems, communicatively coupled together utilizing a network.

In some embodiments, host computer system 102 can be separate from the web content hosting system and receives user-generated web content, such as web content 144, prior to receipt by a web content hosting system. For example, in one embodiment, host computer system 102 is part of a system which provides intermediary support between a user who provides user-generated web content and a web content hosting system.

In one embodiment, host computer system 102 is part of a web content hosting computer system and is coupled to one or more of web content hosting computer systems 1320A-130N by a network. In one embodiment, the network is an intranet network, such as an internal network 126. In other embodiments, the network is an extranet network, such as the Internet, for example, network 124. In one embodiment, one or more of host computer system 102 and web content hosting computer systems 130A-130N is capable of posting user-generated web content, e.g., web content 144.

Web content hosting computer system 130A typically includes a processor 134, a memory 136, and a network interface 138. Web content hosting computer system 130A is connected to network 124, for example, either directly or via network 126. In the present embodiment, web content hosting computer system 130A can post user-generated web content, such as web content 144.

As illustrated in FIG. 1, host computer system 102 is also coupled to a user computer system 128 by network 124. In one embodiment, user computer system 128 is capable of communicating with host computer system 102 over network 124. More particularly, user computer system 128 can communicate user-generated web content 144, for example, a web page generated by user 142, to host computer system 102 via network 124.

In one embodiment, user computer system 128 includes a central processing unit, an input output (I/O) interface, and a memory, having an operating system. User computer system 128 may further include standard devices like a keyboard, a mouse, a printer, a display device and an I/O device(s). The various hardware components of user computer system 128 are not illustrated to avoid detracting from the description.

Network 124 and network 126 can be any network or network system that is of interest to a user. In various embodiments, network interface 138 and I/O interface 110 include analog modems, digital modems, or a network interface card. Further, the particular type of and configuration of host computer system 102, web content hosting computer systems 130A-130N, and user computer system 128, is not essential to this embodiment.

Herein, in one embodiment, malicious code is defined as any computer program, application, set of applications, or code that enters a computer system environment without an authorized user's knowledge and/or without an authorized user's consent. Herein malicious behavior is defined as any behavior exhibited by any computer system, computer program, application, set of applications, or code resulting from malicious code. Herein the term malware is used interchangeably with malicious code.

Figure 2:
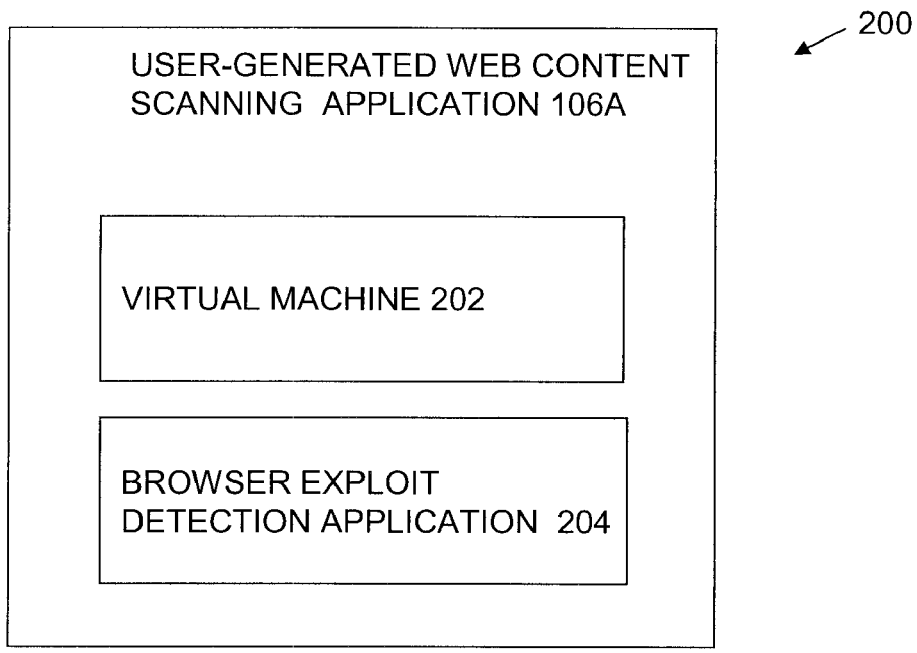
FIG. 2 is a block diagram of the user-generated web content scanning application of FIG. 1 in accordance with one embodiment.

FIG. 2 is a block diagram of user-generated web content scanning application 106 of FIG. 1 in accordance with one embodiment. In one embodiment, user-generated web content scanning application 106 (herein referred to as user-generated web content scanning application 106A in this embodiment) includes: a virtual machine 202; and, a browser exploit detection application 204.

In one embodiment, virtual machine 202 is any one of a variety of virtual machines that can generate a virtual environment for execution of code on a hosting computer system, e.g., host computer system 102. Generally viewed, a virtual machine is software and/or hardware which creates a virtual environment, usually between a computing platform and the associated operating system, so that a user can separately execute software in the virtual environment without compromise to the underlying computer platform. Virtual machines are well known to those of skill in the art and are not further described in detail herein.

In one embodiment, user-generated web content, such as web content 144, is received on host computer system 102 from user computer system 128 via network 124 and routed to virtual machine 202 where the web content, such as a web page, is executed in a virtual environment created by virtual machine 202. As many threats are code-based, these code-based threats can be easily obfuscated by the threat author to avoid detection by current security technologies, such as by an intrusion detection system (IDS) or an anti-virus (AV) engine. Execution of the web content in the virtual environment forces code in the web content to run such that the actions the code takes, especially malicious behavior, are not obfuscated.

In one embodiment, the execution of the user-generated web content, e.g., web content 144, is monitored by browser exploit detection application 204 for malicious behavior. As the execution of the web content occurs in the virtual environment, operating system 104 and host computer system 102 are protected from exploitation by malicious code that may be present in the web content.

In one embodiment, browser exploit detection application 204 is a browser exploit detection system and/or application that can monitor execution of web content, such as web content 144, in the virtual environment created in virtual machine 202, and can detect malicious behavior when it occurs during the execution. Any one or more of various browser exploit detection technologies can be utilized in browser exploit detection application 204.

Figure 3:
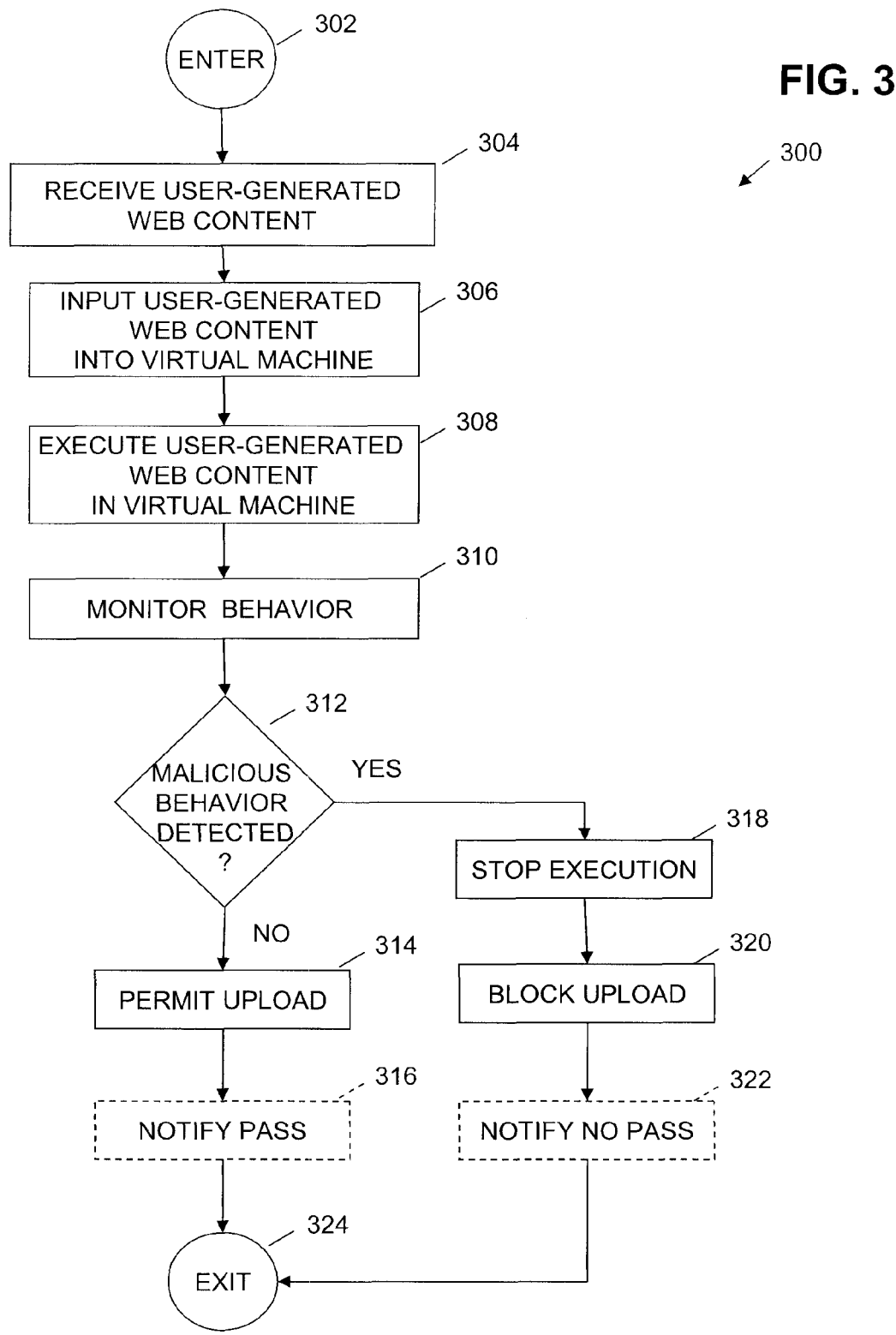
FIG. 3 is a flow diagram of a method for scanning user-generated web content for malicious behavior in accordance with one embodiment.

FIG. 3 is a flow diagram of a process 300 for scanning user-generated web content for malicious behavior in accordance with one embodiment. Referring now to FIGS. 1, 2 and 3 together, in one embodiment, execution of user-generated web content scanning application 106 by processor 108 results in the operations of method 300 as described below. Method 300 is entered at an ENTER operation 302 with processing transitioning to a RECEIVE USER-GENERATED WEB CONTENT operation 304.

In RECEIVE USER-GENERATED WEB CONTENT operation 304, user-generated web content is received. In one embodiment, user-generated web content 144 is received by user-generated web content scanning application 106 of host computer system 102. In one embodiment, the user-generated web content, e.g., web content 144, is a web page.

For example, assume a user, such as user 142, wishes to post a web page advertising an auto on a web content hosting system, such as eBay™, which can post user-generated web content, for example, via web content hosting computer system 130A. User 142 generates web content 144 and sends web content 144 over network 124 to the web content hosting system.

Assume for purposes of description, in this embodiment, host computer system 102 is the designated intake computer system for the web content hosting system. Host computer system 102 receives web content 144 and routes web content 144 to user-generated web content scanning application 106. From RECEIVE USER-GENERATED WEB CONTENT operation 304, processing transitions to an INPUT USER-GENERATED WEB CONTENT INTO VIRTUAL MACHINE operation 306.

In INPUT USER-GENERATED WEB CONTENT INTO VIRTUAL MACHINE operation 306, the user-generated web content received in operation 304 is input to virtual machine 202 of user-generated web content scanning application 106. In one embodiment, web content 144 is a complete web page, and the complete web page is input to virtual machine 202. From INPUT USER-GENERATED WEB CONTENT INTO VIRTUAL MACHINE operation 306, processing transitions to an EXECUTE USER-GENERATED WEB CONTENT IN VIRTUAL MACHINE operation 308.

In EXECUTE USER-GENERATED WEB CONTENT IN VIRTUAL MACHINE operation 308, the user-generated web content input to virtual machine 202 is executed by virtual machine 202 in a virtual environment. As earlier described, execution of the web content in the virtual environment forces code in the web content to run such that the actions the code takes, especially malicious behavior, are not obfuscated.

Typically, web pages include automatic execution code which automatically executes on loading of the web page. For example, on page load JavaScript code automatically executes on loading of the web page. In one embodiment, virtual machine 202 executes the automatic execution code of web content 144. In this way self-executing code, such on page load JavaScript, is executed.

Web pages can further include dynamic page actions, which are typically interactive, e.g., require input of a selection to trigger the execution of additional code. For example, a web page can include selection buttons, such as "SUBMIT", "DOWNLOAD", etc., which require an interactive action, e.g., "clicking" the button. In a further embodiment, in addition to executing the automatic execution code of the web page, virtual machine 202 further dynamically interacts with dynamic page actions in the web content. In this way, virtual machine 202 acts as a virtual person and interactively inputs selections via the dynamic page actions to cause execution of code associated with the dynamic page actions. Accordingly, code that executes on submission of a dynamic interaction with the web page is also executed.

Thus, in a further embodiment, execution of the user-generated web content, e.g., web content 144, further includes executing one or more of the dynamic page actions. Herein the execution of both automatic execution code and dynamic page actions is termed exhaustive execution. From EXECUTE USER-GENERATED WEB CONTENT IN VIRTUAL MACHINE operation 308, processing transitions to a MONITOR BEHAVIOR operation 310.

In MONITOR BEHAVIOR operation 310, the execution of the user-generated web content in virtual machine 202 is monitored by browser exploit detection application 204. In one embodiment, when the execution of web content 144 begins, operation 310 begins monitoring the execution for indications of malicious behavior. Thus, although process flow diagram 300 illustrates operations 308 and 310 linearly, in one embodiment, operations 308 and 310 are performed together. In other embodiments operations 308 and 310 can be performed serially.

In one embodiment, execution of the user-generated web content is continued until the web page is completely executed or until malicious behavior is detected, at which point, execution can stop. Termination of execution on detection of malicious behavior allows efficient use of processing resources by freeing the processing resources to begin evaluation of further user-generated web content submissions. In one embodiment, detection of malicious behavior during execution of web content 144 generates an alert event indicating detection of malicious behavior. From MONITOR BEHAVIOR operation 310, processing transitions to a MALICIOUS BEHAVIOR DETECTED check operation 312.

In MALICIOUS BEHAVIOR DETECTED check operation 212, a determination is made whether malicious behavior is detected in web content 144 based on the monitoring of the execution in operation 310. In one embodiment, as earlier described, execution of web content 144 proceeds in operation 308, with monitoring for malicious behavior continuing in operation 310 until either execution of the web content is completed with no malicious behavior detected, e.g., no alert events, or until malicious behavior is detected, e.g., an alert event is signaled by browser exploit detection application 204.

In one embodiment, if malicious behavior is detected during operation 310 ("YES"), web content 144 is assumed to be unacceptable for posting to the web content hosting system, and execution of the web content is stopped. From MALICIOUS BEHAVIOR DETECTED check operation 312, processing transitions to a STOP EXECUTION operation 318 further described later herein. Alternatively, in one embodiment, if no malicious behavior is detected during operation 310 ("NO"), web content 144 is assumed to be acceptable for posting to the web content hosting system, e.g., for example, for posting on web content hosting computer system 130A. From MALICIOUS BEHAVIOR DETECTED check operation 312, processing transitions to a PERMIT UPLOAD operation 314.

In PERMIT UPLOAD operation 314, the user-generated web content, e.g., web content 144, is permitted to be uploaded, e.g., posted, to the web content hosting system. For example, in one embodiment, user-generated web content scanning application 106 permits web content 144 to be routed to web content hosting computer system 130A, for example, via web content hosting application 140. From PERMIT UPLOAD operation 314, processing transitions to an optional NOTIFY PASS operation 316 or transitions directly to an EXIT operation 324 with processing exiting method 300, if operation 316 is not performed.

In optional NOTIFY PASS operation 316, a notification of the upload approval of the user-generated web content is returned to the submitting computer system. For example, user-generated web content scanning application 106 generates a notification sent to user computer system 128 that indicates web content 144 was approved for uploading to the web content hosting system. From NOTIFY PASS operation 316, processing transitions to EXIT operation 324, with processing exiting method 300, or optionally returning to operation 304 on receipt of a next user-generated submission of web content.

Referring again to MALICIOUS BEHAVIOR DETECTED check operation 312, alternatively, in one embodiment, if malicious behavior is detected during operation 310 ("YES"), web content 144 is assumed to include malicious code and be unacceptable for posting to the web content hosting system. From MALICIOUS BEHAVIOR DETECTED check operation 312, processing transitions to a STOP EXECUTION operation 318.

In STOP EXECUTION operation 318, execution of the user-generated web content by virtual machine 202 in operation 308 is stopped. Thus, monitoring of the behavior in operation 310 also stops. As earlier described, in one embodiment, termination of execution on detection of malicious behavior allows efficient use of processing resources by freeing the processing resources to begin evaluation of further user-generated web content submissions. From STOP EXECUTION operation 318, processing transitions to a BLOCK UPLOAD operation 320.

In BLOCK UPLOAD operation 320, the user-generated web content is blocked from uploading, e.g., posting, to the web content hosting system. For example, in one embodiment, user-generated web content scanning application 106 blocks web content 144 from being routed to web content hosting computer system 130A, for example, blocks routing to content hosting application 140. From BLOCK UPLOAD operation 320, processing transitions to an optional NOTIFY NO PASS operation 322, or transitions directly to EXIT operation 324, if NOTIFY NO PASS operation 322 is not performed.

In optional NOTIFY NO PASS operation 322, a notification of the denial of the user-generated web content is returned to the submitting computer system. For example, user-generated web content scanning application 106 generates a notification for sending to user computer system 128 that indicates the web content was denied for posting to the web content hosting system. From NOTIFY NO PASS operation 322, processing transitions to EXIT operation 324, with processing exiting method 300, or optionally returning to operation 304 on receipt of a next submission of user-generated web content.

Referring again to FIG. 1, although user-generated web content scanning application 106 is referred to as an application, this is illustrative only. User-generated web content scanning application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

The embodiments described herein can be carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a medium configured to store or transport computer readable code in accordance with an embodiment. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible storage medium configured to store computer readable code including CD-ROM discs, DVDs, ROM cards, floppy discs, magnetic tapes, computer hard drives and servers on a network.

As illustrated in FIG. 1, this medium belongs to the computer system itself. However, the medium is also removed from the computer system. For example, user-generated web content scanning application 106 can be stored in memory that is physically located in a location different from processor 108. Processor 108 should be coupled to that memory. This could be accomplished in a client-server system, or alternatively via a connection to another computer via modems and analog lines, or digital interfaces and a digital carrier line.

In various embodiments, host computer system 102 can be a portable computer, a workstation, a two-way pager, a cellular telephone, a digital wireless telephone, a personal digital assistant, a server computer, an Internet appliance, or any other device that includes components that execute user-generated web content scanning application 106 in accordance with at least one of the embodiments described herein. Similarly, in another embodiment, host computer system 102 can be comprised of multiple different computers, wireless devices, cellular telephones, digital telephones, two-way pagers, personal digital assistants, server computers, or any desired combination of these devices that are interconnected to perform the methods as described herein.

In view of this disclosure, user-generated web content scanning application 106 in accordance with one embodiment can be implemented in a wide variety of computer system configurations using an operating system and computer programming language of interest to the user. In addition, user-generated web content scanning application 106 could be stored as different applications in memories of different devices.

For example, user-generated web content scanning application 106 could initially be stored in another computer system (not shown), and as necessary, a portion of user-generated web content scanning application 106 could be transferred to host computer system 102 and executed on host computer system 102. Consequently, part of the functionality would be executed on a processor of the other computer system, and another part would be executed on processor 108 of host computer system 102.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computer-implemented method for scanning user-generated web content for malicious behavior comprising:
   receiving user-generated web content, said user-generated web content for posting to a web content hosting system and being received from the user, the user intending that the content be posted to a website capable of receiving and serving user-generated web content;
   inputting said web content to a virtual machine;
   executing at least a portion of said web content by a web content scanning application, the web content scanning application itself executing within said virtual machine in a virtual environment, wherein executing the web content includes executing automatic execution code of the web content and executing one or more dynamic page actions present in the web content, the dynamic page actions exhaustively performing actions which would normally be performed by a human user, according to the web page content, including actively engaging one or more selection buttons by activating those one or more buttons virtually;
   monitoring said execution of said web content in said virtual environment for malicious behavior;
   determining whether said malicious behavior is detected based upon said monitoring;
   wherein upon a determination that said malicious behavior is detected, blocking posting of said web content to said web content hosting system; and
   wherein upon a determination that said malicious behavior is not detected, permitting posting of said web content to said web content hosting system.

2. The computer-implemented method of claim 1 wherein upon a determination that said malicious behavior is detected, said method further comprising:
   stopping said execution.

3. The computer-implemented method of claim 1 wherein upon a determination that said malicious behavior is not detected, said method further comprising:
   providing a pass notification.

4. The computer-implemented method of claim 1 wherein upon a determination that said malicious behavior is detected, said method further comprising:
   providing a no pass notification.

5. The computer-implemented method of claim 1 wherein said user-generated web content is a web page.

6. The computer-implemented method of claim 1 wherein said execution of said at least a portion of said web content is monitored by a browser exploit detection application.

7. The computer-implemented method of claim 1 wherein said execution comprises:
   executing at least a portion of self-executing computer code present in said web content.

8. The computer-implemented method of claim 1 wherein said execution is an exhaustive execution of said web content.

9. A computer system comprising:
   a memory having stored therein a user-generated web content scanning application; and
   a processor coupled to said memory, wherein execution of said user-generated web content scanning application generates a method comprising:
      receiving user-generated web content, said user-generated web content for posting to a web content hosting system and being received from the user, the user intending that the content be posted to a website capable of receiving and serving user-generated web content;

inputting said web content to a virtual machine;

executing at least a portion of said web content by a web content scanning application, the web content scanning application itself executing within said virtual machine in a virtual environment, wherein executing the web content includes executing automatic execution code of the web content and executing one or more dynamic page actions present in the web content, the dynamic page actions exhaustively performing actions which would normally be performed by a human user, according to the web page content, including actively engaging one or more selection buttons by activating those one or more buttons virtually;

monitoring said execution of said web content in said virtual environment for malicious behavior;

determining whether said malicious behavior is detected based upon said monitoring;

wherein upon a determination that said malicious behavior is detected, blocking posting of said web content to said web content hosting system; and wherein upon a determination that said malicious behavior is not detected, permitting posting of said web content to said web content hosting system.

10. The computer system of claim 9 wherein upon a determination that said malicious behavior is detected, said method further comprising:

stopping said execution.

11. The computer system of claim 9 wherein upon a determination that said malicious behavior is not detected, said method further comprising:

providing a pass notification.

12. The computer system of claim 9 wherein upon a determination that said malicious behavior is detected, said method further comprising:

providing a no pass notification.

13. The computer system of claim 9 wherein said user-generated web content is a web page.

14. The computer system of claim 9 wherein said execution of said at least a portion of said web content is monitored by a browser exploit detection application.

15. The computer system of claim 9 wherein said execution comprises:

executing at least a portion of self-executing computer code present in said web content.

16. The computer system of claim 15 wherein said execution further comprises:

executing one or more dynamic page actions present in said web content.

17. A computer program product comprising:

a nontransitory computer readable storage medium storing computer program code which, when executed by a computing processor, performs a process comprising:

executing user-generated web content by a web content scanning application, the web content scanning application itself executing within a virtual machine in a virtual environment, wherein executing the web content includes executing automatic execution code of the web content and executing one or more dynamic page actions present in the web content, the dynamic page actions exhaustively performing actions which would normally be performed by a human user, according to the web page content, including actively engaging one or more selection buttons by activating those one or more buttons virtually, the user-generated web content scanning application for determining whether malicious behavior is detected in the user-generated web content prior to posting of said user-generated web content to a web content hosting system;

wherein upon a determination that said malicious behavior is detected, said user-generated web content scanning application further for blocking posting of said web content to said web content hosting system; and wherein upon a determination that said malicious behavior is not detected, said user-generated web content scanning application further for permitting posting of said web content to said web content hosting system.

18. The computer program product of claim 17 further comprising:

said user-generated web content scanning application further for receiving said user-generated web content;

said user-generated web content scanning application further for inputting said web content to the virtual machine;

said user-generated web content scanning application further for monitoring said execution of said web content in said virtual environment for malicious behavior; and said user-generated web content scanning application further for determining whether said malicious behavior is detected based upon said monitoring.

19. The computer program product of claim 17, wherein said user-generated web content scanning application comprises:

a virtual machine, said virtual machine for executing said user-generated web content in said virtual environment on a host computer system; and a browser exploit detection application, said browser exploit detection application for monitoring execution of said user-generated web content in said virtual environment for said malicious behavior.

* * * * *